(12) United States Patent
Onishi et al.

(10) Patent No.: US 8,337,099 B2
(45) Date of Patent: Dec. 25, 2012

(54) STRUCTURE FOR MOUNTING CAMERA ON VEHICLE

(75) Inventors: Motoyasu Onishi, Kanagawa (JP); Tadahiro Matori, Saitama (JP)

(73) Assignees: Honda Elesys Co., Ltd., Yokohama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/200,713

(22) Filed: Sep. 29, 2011

(65) Prior Publication Data

US 2012/0099850 A1    Apr. 26, 2012

(30) Foreign Application Priority Data

Oct. 25, 2010  (JP) ................................. 2010-239073

(51) Int. Cl.
*G03B 17/00*      (2006.01)
(52) U.S. Cl. ...................................................... 396/419
(58) Field of Classification Search ........... 396/419–428
See application file for complete search history.

(56) References Cited

U.S. PATENT DOCUMENTS

| 377,355 | A | * | 1/1888 | Duell et al. | 292/303 |
|---|---|---|---|---|---|
| 2007/0237517 | A1 | * | 10/2007 | Park | 396/427 |
| 2008/0231704 | A1 | * | 9/2008 | Schofield et al. | 348/148 |
| 2008/0266389 | A1 | * | 10/2008 | DeWind et al. | 348/115 |

FOREIGN PATENT DOCUMENTS

JP    2010-195235    9/2010

* cited by examiner

*Primary Examiner* — Clayton E Laballe
*Assistant Examiner* — Dennis Hancock

(57) ABSTRACT

One embodiment of the present invention provides a structure for mounting a camera on a vehicle, the structure including: a base unit fixed to a vehicle body; a camera; a slide mechanism configured to allow the camera to slide in an attaching direction so as to be detachably engaged with the base unit; protrusions provided on one of the base unit and the camera, the protrusions being disposed at front left and right sides and rear left and right sides with respect to the attaching direction; and contact portions provided on the other of the base unit and the camera, the contact portions laterally contacting the front left and right protrusions and the rear left and right protrusions, respectively, thereby positioning the camera with respect to the base unit.

13 Claims, 10 Drawing Sheets

STRUCTURE FOR MOUNTING CAMERA ON VEHICLE

CROSS-REFERENCE TO RELATED APPLICATION(S)

This application claims priority from Japanese Patent Application No. 2010-239073 filed on Oct. 25, 2010, the entire contents of which are incorporated herein by reference.

FIELD

The present invention relates generally to a structure for mounting a camera on a vehicle.

BACKGROUND

A camera may be mounted on a vehicle such as a car to capture images outside the vehicle. For example, the camera is used as a part of a drive recorder that records the front image of the vehicle. For example, in JP-2010-195235-A, to mount the camera on the vehicle, an attachment portion is fixed to the front glass of the vehicle using a double-sided tape, and then, the camera is fixed to the attachment portion using bolts.

When the camera is fixed by using the bolts, attaching/detaching the camera to/from the vehicle is inconvenient.

SUMMARY

One object of the present invention is to provide a structure for mounting a camera on a vehicle in which the camera is readily attached/detached to/from the vehicle, and further, a mounting position of the camera can be satisfactorily determined.

Inventive Aspect 1 provides a structure for mounting a camera on a vehicle, the structure including: a base unit (e.g., a base unit 12 in the embodiment) fixed to a vehicle body; a camera (e.g., a camera 11 in the embodiment); a slide mechanism (e.g., slide mechanisms 47 and 95 in the embodiment) configured to allow the camera to slide in an attaching direction so as to be detachably engaged with the base unit; protrusions (e.g., front protrusions 28, 52, and 83 and rear protrusions 29, 53, and 84 in the embodiment) provided on one of the base unit and the camera, the protrusions being disposed at front left and right sides and rear left and right sides with respect to the attaching direction; and contact portions (e.g., front surface portions 39, rear surface portions 41, front contact portions 57, rear contact portions 59, front facing surfaces 89, and rear facing surfaces 90 in the embodiment) provided on the other of the base unit and the camera, the contact portions laterally contacting the front left and right protrusions and the rear left and right protrusions, respectively, thereby positioning the camera with respect to the base unit.

Inventive Aspect 2 provides the structure, wherein the base unit includes slide guide portions (e.g., slide guide portions 26 in the embodiments) provided at the left and right sides in the attaching direction, the slide guide portions having a distance therebetween larger at the front side in the attaching direction than the rear side, wherein the camera includes sliding walls (e.g., sliding walls 43 in the embodiment) provided at the left and right sides in the attaching direction, the sliding walls having facing surfaces (e.g., facing surfaces 38 in the embodiment) in which slide concave portions (e.g., slide concave portions 42 in the embodiment) are formed, the sliding walls having a distance therebetween larger at the front side in the attaching direction than the rear side, and wherein the slide mechanism (e.g., slide mechanism 47 in the embodiment) is formed by the slide guide portions and the slide concave portions.

Inventive Aspect 3 provides the structure, wherein the front left and right protrusions (e.g., front protrusions 28 in the embodiment) and the rear left and right protrusions (e.g., rear protrusions 29 in the embodiment) are formed on the base unit, wherein the front left and right contact portions and the rear left and right contact portions are formed on the camera, wherein a distance between lateral outer ends of the front left and right protrusions is larger than a distance between lateral outer ends of the rear left and right protrusions, and wherein a distance between the front left and right contact portions is larger than a distance between the rear left and right contact portions.

Inventive Aspect 4 provides the structure, wherein the contact portions (e.g., front surface portions 39 and rear surface portions 41 in the embodiment) are formed by the facing surfaces of the left and right sliding walls.

Inventive Aspect 5 provides the structure, wherein the contact portions are formed by left and right inclined surfaces (e.g., inclined surfaces 61 in the embodiment) which have a lateral distance therebetween increased toward the front side in the attaching direction.

Inventive Aspect 6 provides the structure, wherein the front left and right protrusions and the rear left and right protrusions are formed on the base unit so as to be equally spaced apart in the attaching direction, wherein the front left and right contact portions and the rear left and right contact portions are formed on the camera so as to be equally spaced apart in the attaching direction, and wherein front recess portions (e.g., front recess portions 56 in the embodiment) are formed at the front sides of the front left and right contact portions in the attaching direction so as to have an increased lateral distance therebetween, and rear recess portions (e.g., rear recess portions 58 in the embodiment) are formed at the front sides of the rear left and right contact portions in the attaching direction so as to have an increased lateral distance therebetween.

Inventive Aspect 7 provides the structure, wherein the front left and right contact portions and the front left and right recess portions are formed by left and right inclined surfaces (e.g., front inclined surfaces 63 in the embodiment) which have a lateral distance therebetween increased toward the front side in the attaching direction, and wherein the rear left and right contact portions and the front left and right recess portions are formed by the left and right inclined surfaces (e.g., rear inclined surfaces 64 in the embodiment) which have a lateral distance therebetween increased toward the front side in the attaching direction.

Inventive Aspect 8 provides the structure, wherein left and right slide guide portions (e.g., front slide guide portions 81 and rear slide guide portions 82 in the embodiment) are provided on the base unit in plurality along the attaching direction, wherein left and right sliding walls (e.g., front sliding walls 87 and rear sliding walls 88 in the embodiment) are provided on the camera in plurality along the attaching direction, the slide concave portions (e.g., front slide concave portions 92 and rear slide concave portions 93 in the embodiment) being formed on the facing surfaces (e.g., front facing surfaces 89 and rear facing surfaces 90 in the embodiment) of the plurality of left and right sliding walls, and wherein the slide mechanism (e.g., slide mechanism 95 in the embodiment) is formed by the plurality of slide guide portions and the slide concave portions of the plurality of sliding walls.

Inventive Aspect 9 provides the structure, wherein the contact portions are formed by the facing surfaces of the plurality of left and right sliding walls at positions corresponding to the front left and right protrusions and the rear left and right protrusions.

According to Inventive Aspect 1, since the camera can be engaged to the base unit fixed to the vehicle body with the simple sliding operation through the slide mechanism, the camera can be easily attached/detached. When the camera is slid in the attaching direction to be mounted to the base unit, the front left and right protrusions and the rear left and right protrusions laterally contact the contact portions, thereby positioning the camera with respect to the base unit. In this case, the lateral-direction positioning and the rotational-direction positioning can be readily performed, and looseness can be prevented. Since each of the front left and right protrusions and the rear left and right protrusions laterally contact the contact portions, a contact area can be reduced, thereby reducing sliding resistance and facilitating an attaching/detaching operation.

According to Inventive Aspect 2, the slide mechanism is formed by the left and right slide guide portions of the base unit and the slide concave portions of the left and right sliding walls of the camera. And, the distance between the left and the right slide guide portions and the distance between the facing surfaces of the left and right sliding walls are set so as to be larger at the front side than at the rear side in the attaching direction. Thus, the sliding operation between the wide slide concave portions and the narrow left and right slide guide portions are not necessary. Therefore, a sliding amount required for attachment/detachment through the slide mechanism can be shortened, thereby facilitating the attaching/detaching operation.

According to Inventive Aspect 3, the distance between the front left and right protrusions is larger than the distance between the rear left and right protrusions, and the distance between the front left and right contact portions is larger than the distance between the rear left and right contact portions. As a result, the wide front contact portions do not need to contact the narrow rear left and right protrusions. Therefore, positioning can be performed while shortening the sliding amount required for attachment/detachment through the slide mechanism.

According to Inventive Aspect 4, the contact portions which have a distance therebetween larger at the front side than at the rear side are formed by the facing surfaces of the left and right sliding walls which also have a distance therebetween larger at the front side than at the rear side. Thus, the structure can be simplified.

According to Inventive Aspect 5, since the contact portions are formed by the left and right inclined surfaces which have a lateral distance therebetween increased toward the front side in the attaching direction, the front left and right protrusions and the rear left and right protrusions do not simultaneously contact the contact portions just before stopping by positioning. Thus, sliding resistance caused by the contacts can be reduced, thereby facilitating the attaching/detaching operation.

According to Inventive Aspect 6, the front left and right protrusions and the rear left and right protrusions are formed on the base unit, and the front left and right contact portions and the rear left and right contact portions are formed on the camera, to have equal intervals with respect to the attaching direction. Further, the recess portions having a larger lateral difference therebetween is formed at the front sides of the front left and right contact portions having a smaller lateral difference therebetween, and the recess portions having a larger lateral difference therebetween are formed at the front sides of the rear left and right contact portions having a smaller lateral difference therebetween. Thus, the protrusions can be avoided by the recess portions before contacting the contact portions. Therefore, positioning can be performed while shortening the sliding amount required for attachment/detachment through the slide mechanism. Since the front left and right protrusions and the rear left and right protrusions are formed on the base unit, and the front left and right contact portions and the rear left and right contact portions are formed on the camera, to have equal intervals with respect to the attaching direction, positioning precision can be improved.

According to Inventive Aspect 7, the front left and right contact portions and the front left and right recess portions thereof are formed by left and right inclined surfaces which have the lateral distance therebetween increased toward the front side in the attaching direction, and the rear left and right contact portions and the front left and right recess portions are formed by the left and right inclined surfaces which have the lateral distance therebetween increased toward the front side in the attaching direction. As a result, the front left and right protrusions and the rear left and right protrusions do not simultaneously contact the contact portions just before stopping by positioning. Thus, sliding resistance caused by the contacts can be reduced, thereby facilitating the attaching/detaching operation.

According to Inventive Aspect 8, a plurality of rows of left and right slide guide portions are formed on the base unit, and a plurality of rows of left and right sliding walls in which the slide concave portions are formed on the facing surfaces thereof are formed on the camera, with an interval in the attaching direction. Thus, the sliding operation starts from a state where the slide guide portions on each row and the sliding walls on each row are dislocated in the front-rear direction. And, the sliding operation is required merely for engaging the rows of front and rear slide concave portions with the rows of front and rear slide guide portions. Therefore, the sliding amount required for attachment/detachment can be shortened, thereby facilitating the attaching/detaching operation.

According to Inventive Aspect 9, the front left and right protrusions and the rear left and right protrusions are correspondingly provided with the contact portions which are formed by the facing surfaces of the rows of sliding walls. As a result, positioning precision can be improved. And, since the contact portions are formed by the facing surfaces of the sliding walls, the structure can be simplified.

DETAILED DESCRIPTION

A structure for mounting a camera on a vehicle according to a first embodiment will be described hereinafter with reference to FIGS. 1 and 2.

Figure 1A:
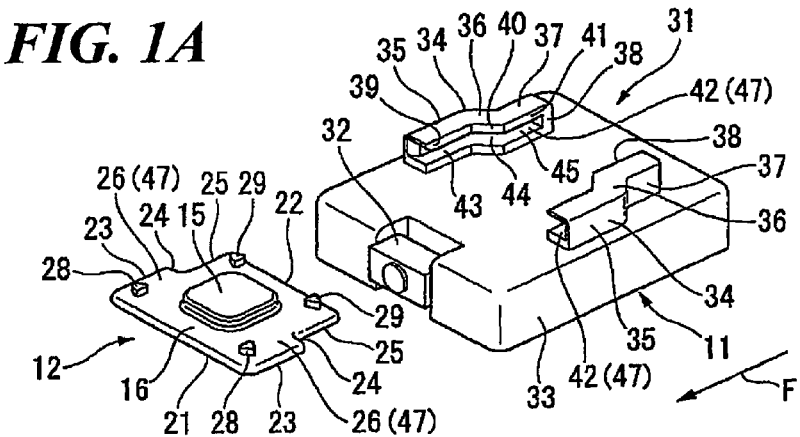
FIGS. 1A to 1C illustrate a first embodiment, FIG. 1A illustrating a disassembled state, FIG. 1B illustrating a state before engagement, FIG. 1C illustrating a state after the engagement.
Figure 1B:
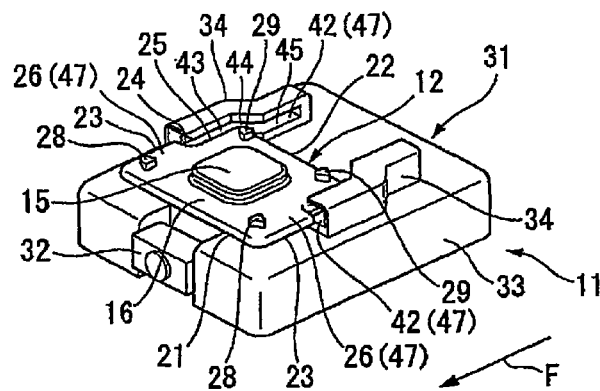
Figure 1C:
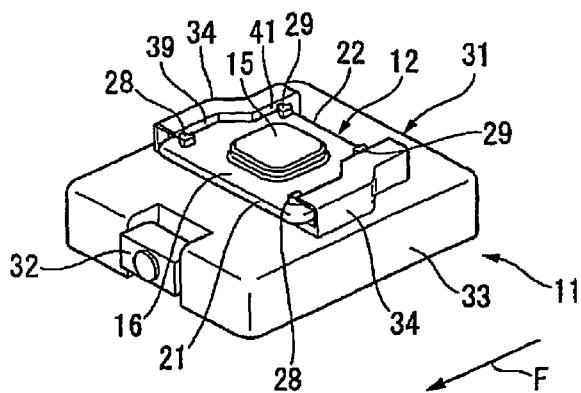

The drawings illustrate a camera 11 and a base unit 12 for mounting the camera 11 on a vehicle. As shown in FIGS. 1A to 1C, the camera 11 is configured to be attached/detached by being slid with respect to the base unit 12. An arrow F represents an attaching direction in which the camera 1 is slid to be mounted. Generally, a vehicle includes a front glass which is forwardly and downwardly inclined. For example, the base unit 12 is fixed to the front glass toward the attaching direction F.

As shown in FIG. 1A, the base unit 12 has a generally bilateral shape. The base unit 12 includes an attachment portion 15 that has a low-height rectangular-plate-like shape and a guide plate portion 16 that has a plate shape expanding transversely from the bottom of the attachment portion 15. The attachment portion 15 and the guide plate portion 16 are integrally formed, specifically by a metal cast. The base unit 12 is attached by bonding the top surface of the attachment portion 15 with the front glass by a double-sided adhesive sheet.

The guide plate portion 16 includes a front edge 21 and a rear edge 22 parallel to each other. And, the guide plate portion 16 further includes a front longitudinal edge 23, a middle lateral edge 24 and a rear longitudinal edge 25 at each of left and right sides thereof. In each of the left and right sides, the front longitudinal edge 23 extends rearwardly from the lateral outer ends of the front edge 21, the middle lateral edges 24 extends laterally inwardly from the rear end of the front longitudinal edge 23, and the rear longitudinal edge 25 extend rearwardly from the inner end of the middle lateral edge 24 so as to be connected to the lateral outer ends of the rear edge 22. The left and right front longitudinal edges 23 and 23, the left and right middle lateral edges 24 and 24, and the left and right rear longitudinal edges 25 and 25 form left and right sliding guide portions 26 and 26, respectively. The sliding guide portions 26 and 26 extend beyond the left and right sides of the attachment portion 15. Thus, in the attaching direction F, a distance between the sliding guide portions 26 and 26 is larger at the front side than at the rear side.

A pair of front protrusions 28 and 28 and a pair of rear protrusions 29 and 29 protrude upwardly from the top surface of the guide plate portion 16. Each front protrusion 28 is provided inside a corner defined by the front edge 21 and each front longitudinal edge 23. Each rear protrusion 29 is provided inside a corner defined by the rear edge 22 and each rear longitudinal edge 25. That is, on the base unit 12, the front protrusions 28 are disposed at the front left and right sides and the rear protrusions 29 are disposed at the rear left and right sides with respect to the attaching direction F, respectively. The front protrusions 28 and 28 and the rear protrusions 29 and 29 are formed, for example, by casting as parts of the base unit 12.

Figure 2A:
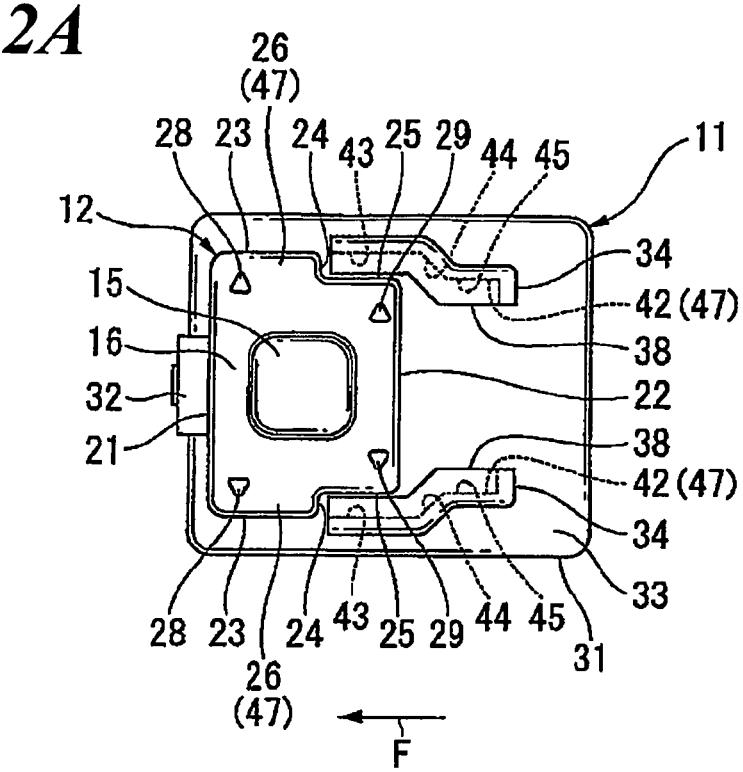
FIGS. 2A and 2B illustrate the states before and after engagement from above.

As shown in FIG. 2A, the front protrusions 28 and 28 and the rear protrusions 29 and 29 each has a triangular pole shape which becomes thinner toward the outer side in the lateral direction. The distance between the lateral outer ends of the front protrusions 28 and 28 is larger than the distance between the lateral outer ends of the rear protrusions 29 and 29.

As shown in FIG. 1A, the camera 11 includes a camera body 31 and a lens unit 32. The camera body 11 has various built-in parts for capturing an image. The lens unit 32 is connected to the front side of the camera body 31 so as to be rotatable along the up-down direction and so as to face toward the front of the vehicle. The camera body 31 is covered with a case 33, and left and right sliding walls 34 and 34 protrude upward from the top surface of the case 33 so as to extend in the front-rear direction. The case 33 has the generally bilateral shape. The entire case 33 is integrally formed with the sliding walls 34 and 34, specifically by a metal cast.

Figure 2B:
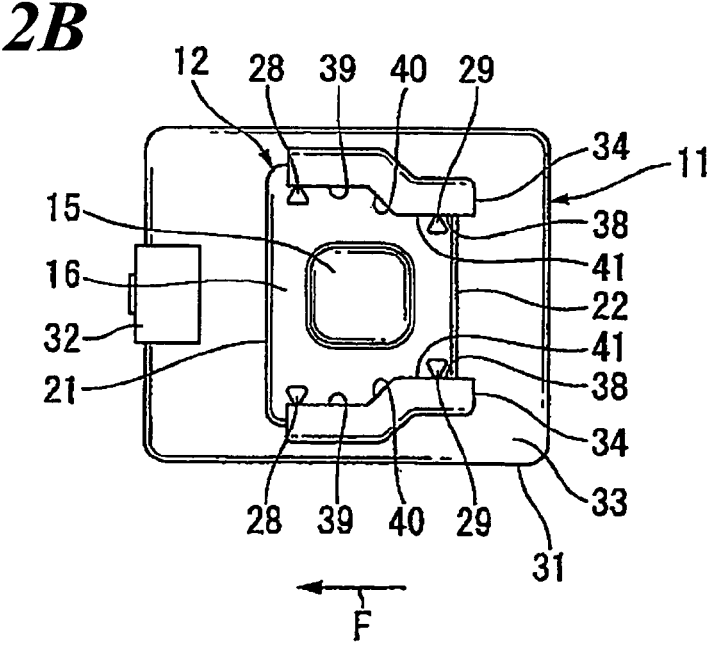

Each sliding wall 34 includes a front wall 35, a middle wall 36 and a rear wall 37. The front wall 35 extends rearward in the front-rear direction, the middle wall 36 inwardly inclines from the rear end of the front wall 35, and the rear wall 37 extends rearward in the front-rear direction from the rear end of the middle wall 36. The sliding walls 34 and 34 are cut to form facing surfaces 38 and 38 perpendicular to the top surface of the case 33. As shown in FIG. 2B, each facing surface 38 includes a front surface portion (contact portion) 39, a middle surface portion 40 and a rear surface portion (contact portion) 41. The front surface portion 39 extends in the front-rear direction, the middle surface portion 40 inwardly inclines from the rear end of the front surface portion 39, and the rear surface portion 41 extends in the front-rear direction from the rear end of the middle surface portion 40. The facing surfaces 38 and 38 are disposed at the left and right sides with respect to the attaching direction F along which the camera 11 is mounted to the base unit 12 so that a distance therebetween at the front side is larger than at the rear side. The distance between the front surface portions 39 and 39 is larger than a distance between the rear longitudinal edges 25 and 25 of the base unit 12, as shown in FIG. 2A.

A slide concave portion 42 is depressed from the facing surface 38 of each sliding wall 34 to have a substantially constant depth. The slide concave portion 42 is formed at a vertical middle position of the facing surface 38, and extends in parallel to the top surface of the case 33, as shown in FIG. 1A. Each slide concave portion 42 includes a front concave portion 43 formed at the front surface portion 39, a middle concave portion 44 formed at the middle surface portion 40, and a rear concave portion 45 formed at the rear surface portion 41. While the front side of the slide concave portion 42 is opened, the rear side of the slide concave portion 42 is closed.

The camera 11 is mounted on the base unit 12, by inserting the sliding guide portions 26 and 26 into the slide concave portions 42 and 42, and sliding them toward the attaching direction F. The camera 11 is then removed by reversely sliding the inserted sliding guide portions 26 and 26 from the slide concave portions 42 and 42. That is, the camera 11 moves along the sliding guide portions 26 and 26 when being attached and detached. The sliding guide portions 26 and 26 and the slide concave portions 42 and 42 form a slide mechanism 47 for detachably engaging the camera 11 to the base unit 12 through a sliding operation.

As shown in FIG. 2B, the distance between the lateral outer ends of the front protrusions 28 and 28 of the base unit 12 is substantially the same with the distance between the front surface portions 39 and 39 of the camera 11, and the distance between the lateral outer ends of the rear protrusions 29 and 29 of the base unit 12 is substantially the same with the distance between the rear surface portions 41 and 41 of the camera 11. The front left and right surface portions 39 and 39 and the rear left and right surface portions 41 and 41 laterally contact the front left and right protrusions 28 and 28 and the rear left and right protrusions 29 and 29, respectively, thereby positioning the camera 11 with respect to the base unit 12.

When the camera 11 is attached to the base unit 12 fixed to the front glass, the left and right slide guide portions 26 and 26 (of the slide mechanism 47) are inserted into the left and right slide concave portions 42 and 42 (of the slide mechanism 47), and the camera 11 is forwardly slid in the front-rear direction of the vehicle, as shown in FIGS. 1B and 1C. At the beginning of the attaching operation, as shown in FIG. 1A, since the distance between the front surface portions 39 and 39 is larger than the distance between the rear longitudinal edges 25 and 25, the sliding operation between the front concave portions 43 and 43 (formed at the front surface portions 39 and 39) and the rear longitudinal edges 25 and 25. Then, as shown in FIGS. 1B and 1C, the rear longitudinal edges 25 and 25 are inserted into the rear concave portions 45 and 45 while the front longitudinal edges 23 and 23 are inserted into the front concave portions 43 and 43, and the camera 11 is forwardly slid in the front-rear direction of the vehicle. During the sliding operation, as shown in FIGS. 2A and 2B, the front left and right protrusions 28 and 28 respectively contact the front left and right surface portions 39 and 39, while the rear left and right protrusions 29 and 29 respectively contact the rear left and right surface portions 41 and 41. Finally, the rear end portions of the rear concave portions 45 and 45 of the slide concave portions 42 and 42 contact the rear edge 22 of the guide plate portion 16 so that the camera 11 stops, as shown in FIGS. 1C and 2B. In this state, the front protrusions 28 and 28 laterally contact the front surface portions 39 and 39 and the rear protrusions 29 and 29 laterally contact the rear surface portions 41 and 41, thereby positioning the camera 11 with respect to the base unit 12.

According to the first embodiment, the following effect can be achieved.

Since the camera 11 slides to engage with the base unit 12 fixed to the vehicle body through the slide mechanism 47, the camera 11 can be easily attached/detached. The base unit 12 includes the front protrusions 28 and 28 and the rear protrusions 29 and 29 which are disposed laterally with respect to the attaching direction F to contact the front surface portions 39 and 39 and the rear surface portions 41 and 41 of the camera 11. Thus, the positioning in the lateral direction and in the rotational direction of the camera 11 with respect to the base unit 12 can be readily performed, and wobbling can be prevented. Since merely the front protrusions 28 and 28 and the rear protrusions 29 and 29 laterally contact the front surface portions 39 and 39 and the rear surface portions 41 and 41, a contact area can be minimized, and sliding resistance can be reduced, thereby facilitating an attaching/detaching operation.

The slide mechanism 47 is formed by the left and right slide guide portions 26 and 26 of the base unit 12 and the slide concave portions 42 and 42 of the left and right sliding walls 34 and 34 of the camera 11. And, the distance between the slide guide portions 26 and 26 and the distance between the facing surfaces 38 and 38 of the sliding walls 34 and 34 are set so as to be larger at the front side than at the rear side in the attaching direction F. Thus, the sliding operation between the wide front concave portions 43 and 43 of the slide concave portions 42 and 42 and the narrow rear longitudinal edges 25 and 25 of the left and right slide guide portions 26 and 26 are not necessary. Therefore, a sliding amount required for attachment/detachment through the slide mechanism 47 can be shortened, thereby facilitating the attaching/detaching operation.

The distance between the front left and right protrusions 28 and 28 is larger than the distance between the rear left and right protrusions 29 and 29, and the distance between the front left and right surface portions 39 and 39 is larger than the distance between the rear left and right surface portions 41 and 41. As a result, the wide front surface portions 39 and 39 do not need to contact the narrow rear protrusions 29 and 29. Therefore, positioning of the camera 11 can be performed while shortening the sliding amount required for attachment/detachment through the slide mechanism 47.

The left and right sliding walls 34 and 34 have the distance therebetween larger at the front side than at the rear side with respect to the attaching direction F. And, the front surface portions 39 and 39 and the rear surface portions 41 and 41 form a positioning contact portions to be contacted by the front protrusions 28 and 28 and the rear protrusions 29 and 29. Thus, a structure can be simplified.

Figure 4:
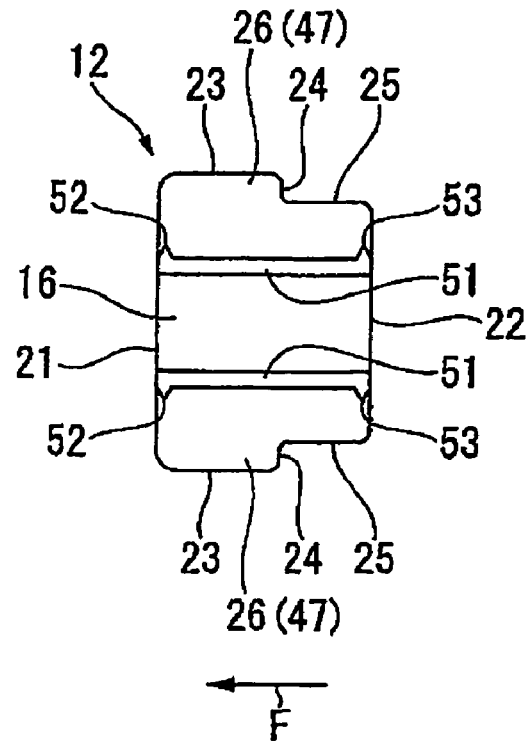
FIG. 4 illustrates a base unit according to the second embodiment from below.
Figure 5:
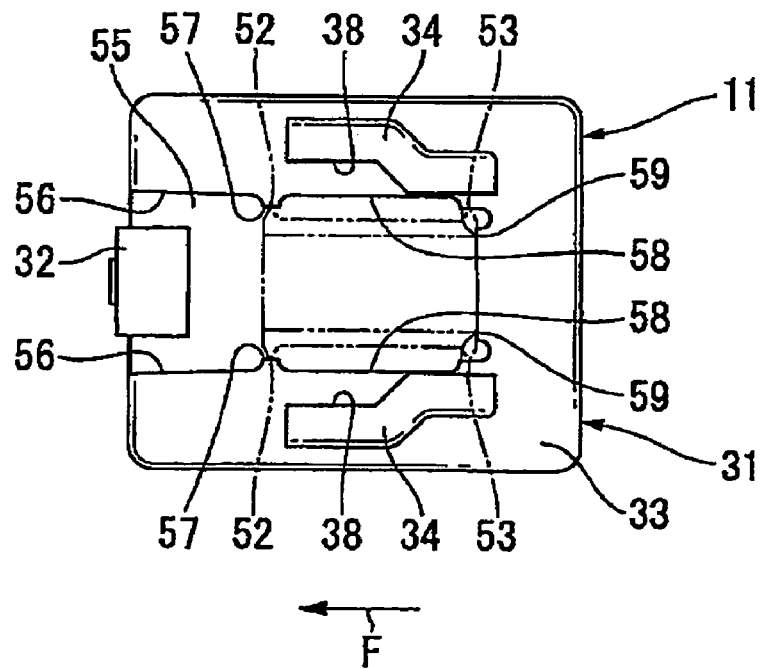
FIG. 5 illustrates an engagement state of front and rear protrusions of the base unit from above.

A structure for mounting a camera on a vehicle according to a second embodiment will be described focusing on a difference from the first embodiment with reference to FIGS. 3 to 5.

In the second embodiment, as shown in FIG. 3, the front protrusions 28 and 28 and the rear protrusions 29 and 29 on the base unit 12 of the first embodiment are not formed. Instead, a pair of extension plate portions 51 and 51 protrude downward from the bottom of the base unit 12. The left and right extension plate portions 51 and 51 extend in the front-rear direction. As shown in FIG. 4, each extension plate portion 51 has a front protrusion 52 and a rear protrusion 53. The front protrusion 52 protrudes outwardly laterally from a front end portion of the extension plate portion 51, and the rear protrusion 53 protrudes outwardly laterally from a rear end portion of the extension plate portion 51. That is, the front protrusions 52 are disposed at the front left and right sides, and the rear protrusion 53 are disposed at the rear left and right sides, with respect to the attaching direction F.

The front protrusions 52 and 52 and the rear protrusions 53 and 53 each has a triangular pole shape which becomes thinner toward the outer side in the lateral direction. The distance between the lateral outer ends of the front protrusions 52 and 52 is substantially the same with the distance between the lateral outer ends of the rear protrusions 53 and 53. In the other words, the front right protrusion 52 and the rear right protrusion 53 are aligned in a line extending in the attaching direction F, and the rear left protrusion 52 and the rear left protrusion 53 are also aligned in a line extending in the attaching direction F. The front protrusions 52 and 52 and the rear protrusions 53 and 53 are formed, for example, by casting as parts of the base unit 12.

In the second embodiment, as shown in FIG. 3, a top concave portion 55 is formed on the top surface of the case 33 so as to be slightly depressed therefrom between the left and right sliding walls 34. The top concave portion 55 is formed by cutting. At each of the left and right sides of the top concave portion 55, a front recess portion 56, a front contact portion 57, a rear recess portion 58 and a rear contact portion 59 are continuously formed from a front position to a rear position in the attaching direction F. The front contact portion 57 inwardly protrudes than the front recess portion 56 at the rear side thereof, and the rear contact portion 59 inwardly protrudes than the rear recess portion 58 at the rear side thereof. In other words, as shown in FIG. 5, the front recess portions 56 and 56 having a larger distance therebetween are formed at the front side of the front left and right contact portions 57 and 57 having a smaller distance therebetween, and the rear recess portions 58 and 58 having a larger distance therebetween are also formed at the front side of the rear left and right contact portions 59 and 59 having a smaller distance therebetween. The lateral distance between the front contact portions 57 and 57 is substantially the same with the lateral distance between the rear contact portions 59 and 59. Thus, the front right contact portion 57 and the rear right contact portion 59 are aligned in a line extending in the attaching direction F, and the front left contact portion 57 and the rear left contact portion 59 are also aligned a line extending in the attaching direction F.

In the second embodiment, the distance between the lateral outer ends of the front protrusions 52 and 52 is substantially the same with the distance between the front contact portions 57 and 57. And, the distance between the lateral outer ends of the rear protrusion 53 and 53 is substantially the same with the distance between the rear contact portions 59 and 59. Thus, the front left and right contact portions 57 and 57 and the rear contact portions 59 and 59 laterally contact the front left and right protrusions 52 and 52 and the rear left and right protrusions 53 and 53, respectively, thereby positioning the camera 11 with respect to the base unit 12.

Figure 3A:
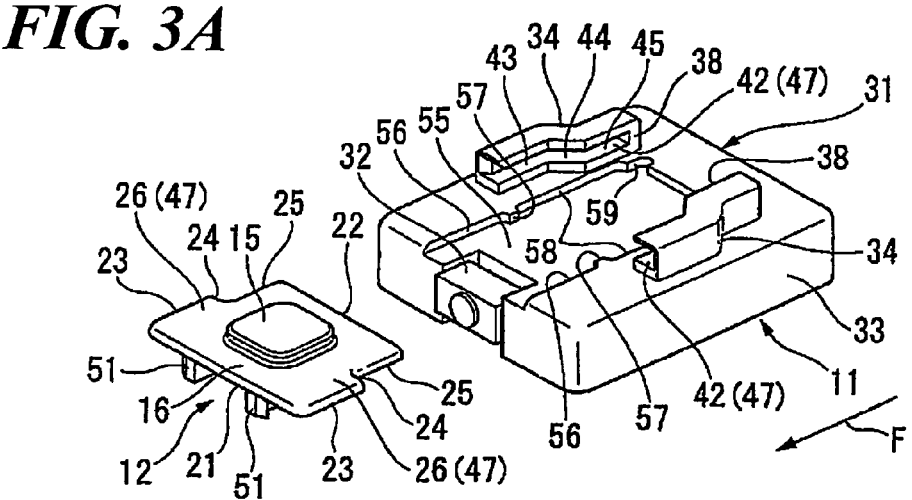
FIGS. 3A and 3B illustrate a second embodiment, FIG. 3A illustrating a disengaged state, FIG. 3B illustrating an engaged state.
Figure 3B:
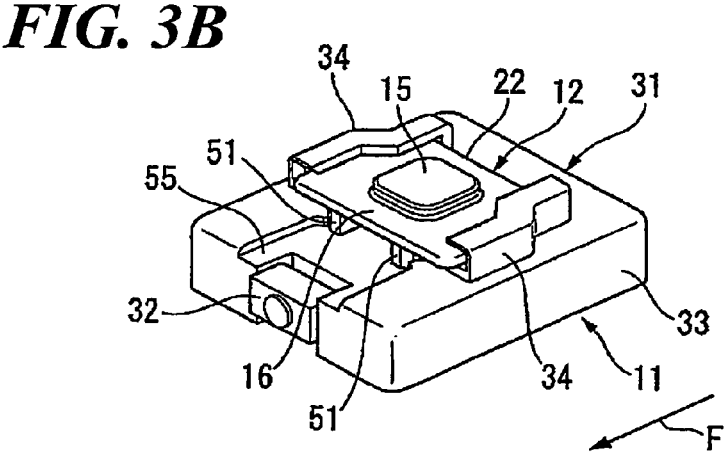

When the camera 11 is attached to the base unit 12, as shown in FIGS. 3A and 3B, the rear longitudinal edges 25 and 25 of the slide guide portions 26 and 26 are inserted into the rear concave portions 45 and 45 of the slide concave portions 42 and 42 while the front longitudinal edges 23 and 23 of the slide guide portions 26 and 26 are inserted into the front concave portions 43 and 43 of the slide concave portions 42 and 42, and the camera 11 is forwardly slid in the front-rear direction of the vehicle, similarly as the first embodiment. During the sliding operation, as shown in FIG. 5, the front left and right protrusions 52 and 52 are avoided from contacting the camera 11 by the front left and right recess portions 56 and 56, and the rear left and right protrusions 53 and 53 are avoided from contacting the camera 11 by the rear left and right recess portions 58 and 58. And, finally, the front left and right protrusions 52 and 52 laterally contact the front left and right contact portions 57 and 57, respectively, and the rear left and right protrusions 53 and 53 laterally contact the rear left and right contact portions 59 and 59, respectively, thereby positioning the camera 11 with respect to the base unit 12.

According to the second embodiment, the front left and right protrusion 52 and 52 and the rear left and right protrusions 53 and 53 are formed on the base unit 12, and the front left and right contact portions 57 and 57 and the rear left and right contact portions 59 and 59 are formed on the camera 11, to have equal intervals with respect to the attaching direction F. Further, the front recess portions 56 and 56 having a larger lateral distance therebetween is formed at the front side of the front contact portions 57 and 57 having a smaller lateral distance therebetween, and the rear recess portions 58 and 58 having a larger lateral distance therebetween are formed at the front side of the rear contact portions 59 and 59 having a smaller lateral distance therebetween. Thus, the front protrusions 52 and 52 and the rear protrusions 53 and 53 are avoided by the front recess portions 56 and 56 and the rear recess portions 58 and 58 before contacting the front contact portions 57 and 57 and the rear contact portions 59 and 59. Therefore, positioning can be performed while shortening the sliding amount required for attachment/detachment through the slide mechanism 47.

Since the front left and right protrusions 52 and 52 and the rear left and right protrusions 53 and 53 are formed on the base unit 12, and the front left and right contact portions 57 and 57 and the rear left and right contact portions 59 and 59 are formed on the camera 11, to have equal intervals with respect to the attaching direction F, positioning precision can be increased. For example, lateral inner ends of the front left contact portion 57 and the rear left contact portion 59 may be processed by linearly moving a tool at one time. Also, lateral inner ends of the front right contact portion 57 and the rear right contact portion 59 may be processed by linearly moving a tool at one time. Ss a result, forming precision can be improved, thereby further improving positioning precision.

Referring to FIGS. 6A to 8, a structure for mounting a camera on a vehicle according to a third embodiment will be described focusing on a difference from the second embodiment.

Figure 7:
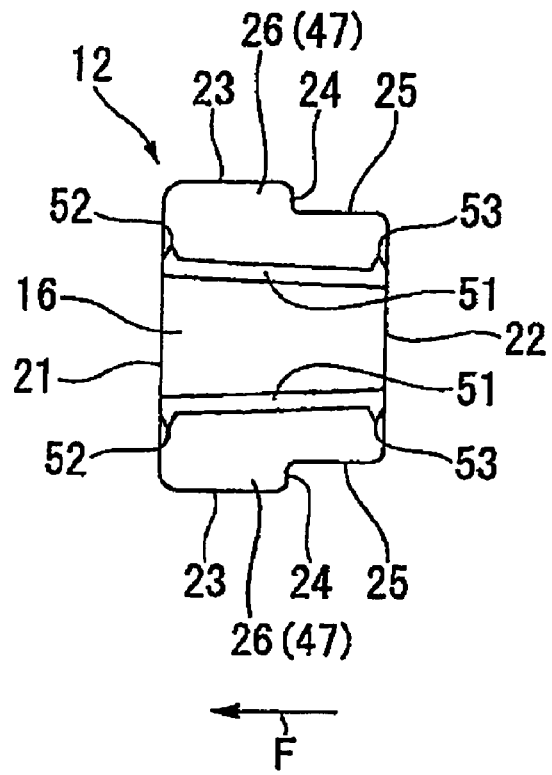
FIG. 7 illustrates a base unit according to the third embodiment from below.

In the third embodiment, as shown in FIG. 7, left and right extension plate portions 51 and 51 of the base unit 12 are inclined so that a distance therebetween is increased toward the front side in the attaching direction F. That is, the distance between the lateral outer ends of the left and right front protrusions 52 and 52 is larger than the distance between the lateral outer ends of the left and right rear protrusions 53 and 53.

Figure 6A:
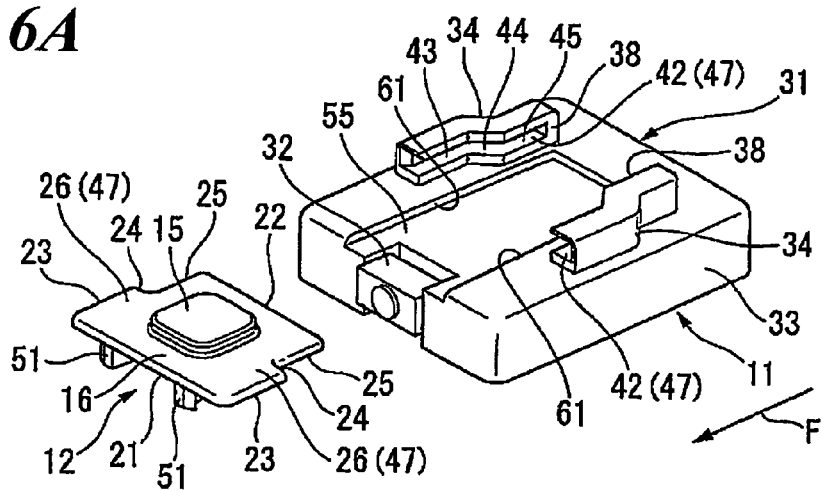
FIGS. 6A and 6B illustrate a third embodiment, FIG. 6A illustrating a disengaged state, FIG. 6B illustrating an engaged state.
Figure 6B:
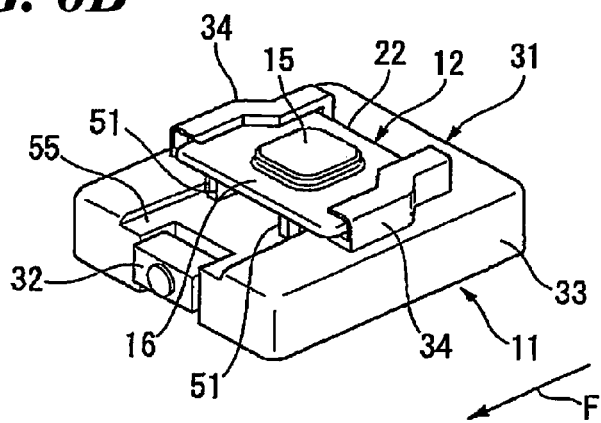
Figure 8:
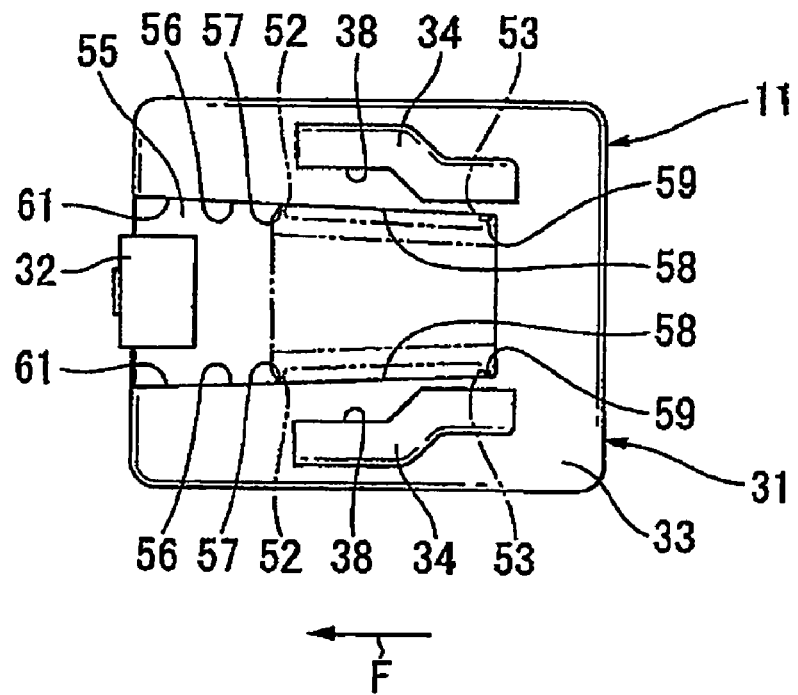
FIG. 8 illustrates an engagement state of front and rear protrusions of the base unit from above.

In the third embodiment, as shown in FIGS. 6A, 6B and 8, the left and right end edges of the top concave portion 55 are formed as inclined surfaces 61 and 61 which have a lateral distance therebetween increased toward the front side in the attaching direction F.

In the third embodiment, the left and right inclined surfaces 61 and 61 of the camera 11 laterally contact the front left and right protrusions 52 and 52 and the rear left and right protrusions 53 and 53 of the base unit 12, respectively, thereby positioning the camera 11 with respect to the base unit 12. In this case, as shown in FIG. 8, portions of the inclined surfaces 61 and 61 contacting the front protrusions 52 and 52 become the front contact portions 57 and 57 while the front sides thereof become the front recess portions 56 and 56, and portions of the inclined surfaces 61 and 61 contacting the rear protrusions 53 and 53 become the rear contact portions 59 and 59 while the front sides thereof become the rear recess portions 58 and 58.

When the camera 11 is attached to the base unit 12, as shown in FIGS. 6A and 6B, the rear longitudinal edges 25 and 25 of the slide guide portions 26 and 26 are inserted into the rear concave portions 45 and 45 of the slide concave portions 42 and 42 while the front longitudinal edges 23 and 23 of the slide guide portions 26 and 26 are inserted into the front concave portions 43 and 43 of the slide concave portions 42 and 42, and the camera 11 is forwardly slid in the front-rear direction of the vehicle, similarly as the first embodiment. During the sliding operation, the front left and right protrusions 52 and 52 and the rear left and right protrusions 53 and 53 are avoided from contacting the camera 11 by the front left and right recess portions 56 and 56 and the rear left and right recess portions 58 and 58 of the inclined surfaces 61 and 61. And, finally, as shown in FIG. 8, the front left and right protrusions 52 and 52 laterally contact the front left and right contact portions 57 and 57, respectively, and the rear left and right protrusions 53 and 53 laterally contact the rear left and right contact portions 59 and 59, respectively, thereby positioning the camera 11 with respect to the base unit 12.

According to the third embodiment, the front contact portions 57 and 57 and the rear contact portions 59 and 59 that perform positioning by contacting the front left and right protrusions 52 and 52 and the rear left and right protrusions 53 and 53 are formed by the left and right inclined surfaces 61 and 61 which have the lateral distance therebetween increased toward the front side in the attaching direction F. As a result, the front protrusions 52 and 52 and the rear protrusions 53 and 53 do not simultaneously contact the inclined surfaces 61 and 61 just before stopping by positioning. Thus, sliding resistance caused by the contacts can be reduced, thereby facilitating the attaching/detaching operation.

Figure 9A:
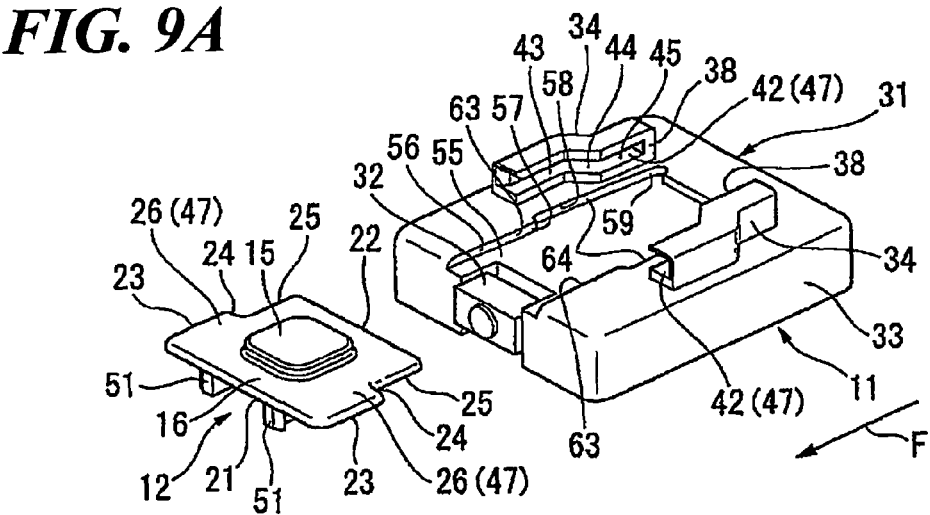
FIGS. 9A and 9B illustrate a fourth embodiment, FIG. 9A illustrating a disengaged state, FIG. 9B illustrating an engaged state.
Figure 9B:
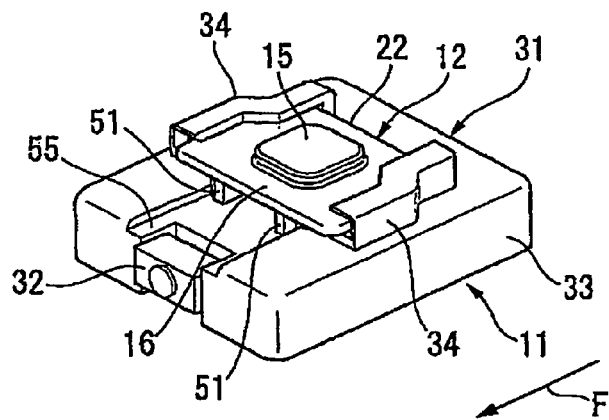
Figure 10:
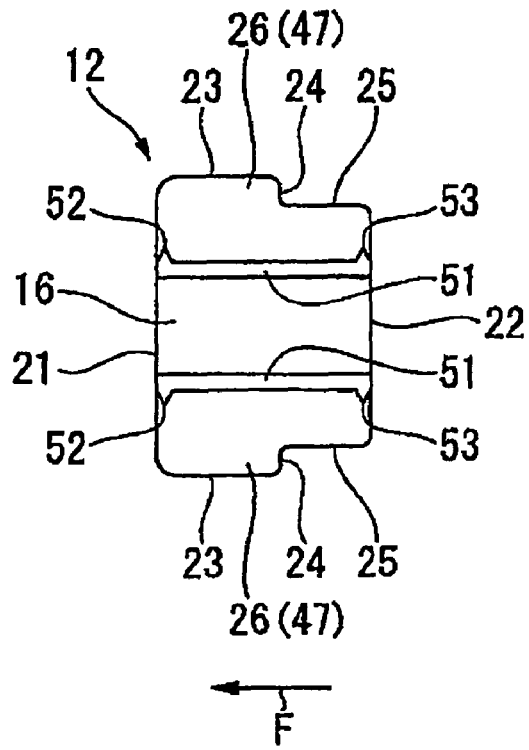
FIG. 10 illustrates a base unit according to the fourth embodiment from below.
Figure 11:
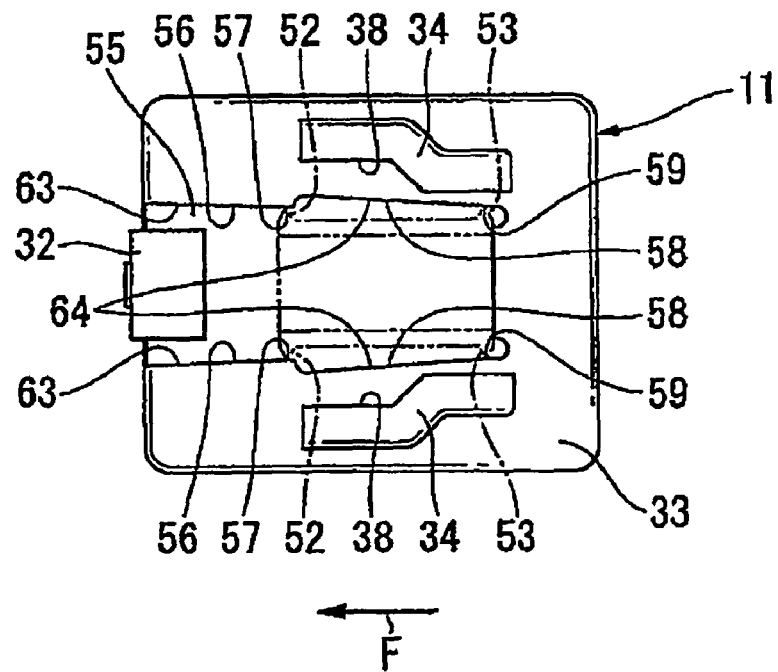
FIG. 11 illustrates an engagement state of front and rear protrusions of the base unit from above.

Referring to FIGS. 9 to 11, a structure for mounting a camera on a vehicle according to a fourth embodiment will be described focusing on a difference from the second embodiment.

In the fourth embodiment, the front recess portions 56 and 56 and the front contact portions 57 and 57 of the top concave portion 55 are formed by the front inclined surfaces 63 and 63 which have the distance therebetween increased toward the front side in the attaching direction F, and the rear recess portions 58 and 58 and the rear contact portions 59 and 59 are also formed by rear inclined surfaces 64 and 64 which have the distance therebetween increased toward the front side in the attaching direction F.

In the fourth embodiment, the front left and right inclined surfaces 63 and 63 and the rear left and right inclined surfaces 64 and 64 of the camera 11 laterally contact the front left and right protrusions 52 and 52 and the rear left and right protrusions 53 and 53 of the base unit 12, respectively, thereby positioning the camera 11 with respect to the base unit 12, as shown in FIG. 11. In this case, portions of the front inclined surfaces 63 and 63 contacting the front protrusions 52 and 52 become the front contact portions 57 and 57 while the front sides thereof become the front recess portions 56 and 56, and portions of the rear inclined surfaces 64 and 64 contacting the rear protrusions 53 and 53 become the rear contact portions 59 and 59 while the front sides thereof become the rear recess portions 59 and 59. The front contact portions 57 and 57 are spaced apart from the rear contact portions 59 and 59 to have equal intervals.

When the camera 11 is attached to the base unit 12, as shown in FIGS. 9A and 9B, the rear longitudinal edges 25 and 25 of the slide guide portions 26 and 26 are inserted into the rear concave portions 45 and 45 of the slide concave portions 42 and 42 while the front longitudinal edges 23 and 23 of the slide guide portions 26 and 26 are inserted into the front concave portions 43 and 43 of the slide concave portions 42 and 42, and the camera 11 is forwardly slid in the front-rear direction of the vehicle, similarly as the first embodiment. During the sliding operation, as shown in FIG. 11, the front left and right protrusions 52 and 52 and the rear left and right protrusions 53 and 53 are avoided from contacting the camera 11 by the front recess portions 56 and 56 of the front inclined surfaces 63 and 63 and the rear recess portions 58 and 58 of the rear inclined surfaces 64 and 64. And, finally, the front left and right protrusions 52 and 52 laterally contact the front contact portions 57 and 57, respectively, and the rear left and right protrusions 53 and 53 laterally contact the rear contact portions 59 and 59, respectively, thereby positioning the camera 11 with respect to the base unit 12.

According to the fourth embodiment, the front contact portions 57 and 57 and the front recess portions 56 and 56 are formed by the front inclined surfaces 63 and 63 which have the lateral distance therebetween increased toward the front side in the attaching direction F. And, the rear contact portions 59 and 59 and the rear recess portions 58 and 58 are formed by the rear inclined surfaces 64 and 64 which are have the lateral distance therebetween increased toward the front side in the attaching direction F. As a result, the front protrusions 52 and 52 and the rear protrusions 53 and 53 do not simultaneously contact the front inclined surfaces 63 and 63 and the rear inclined surfaces 64 and 64 just before stopping by positioning. Thus, sliding resistance caused by the contacts can be reduced, thereby facilitating the attaching/detaching operation.

Figure 12A:
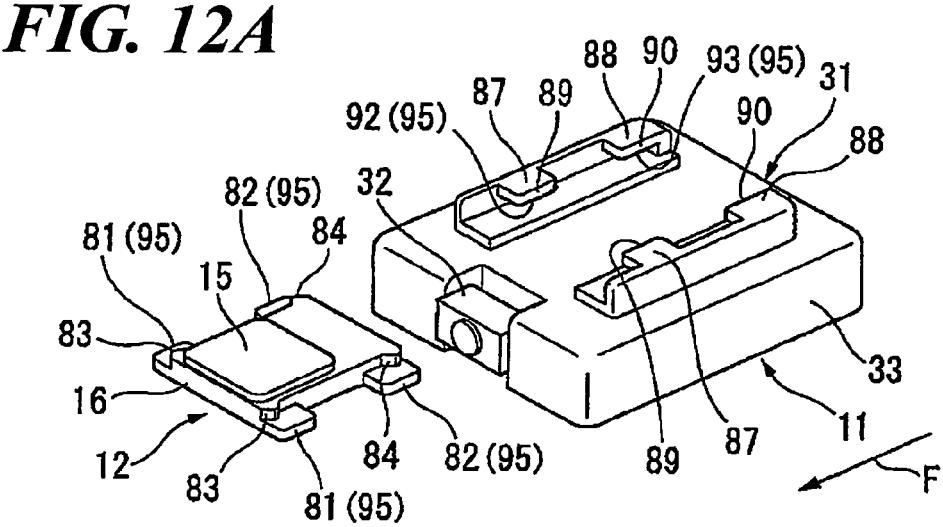
FIGS. 12A to 12C illustrate a fifth embodiment, FIG. 12A illustrating a disassembled state, FIG. 12B illustrating a state before engagement, FIG. 12C illustrating a state after the engagement.
Figure 12B:
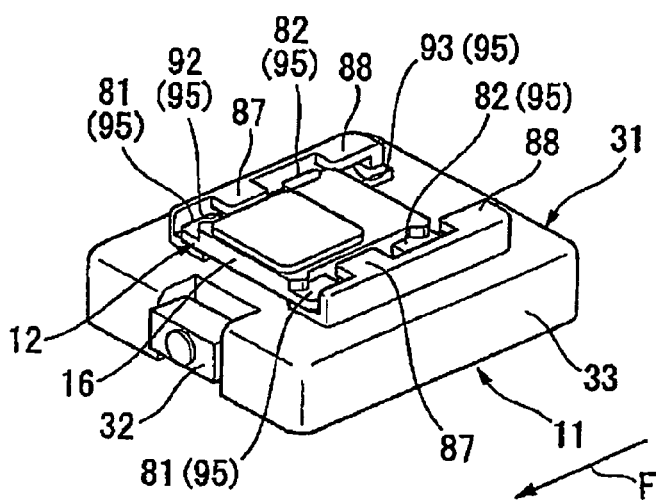
Figure 12C:
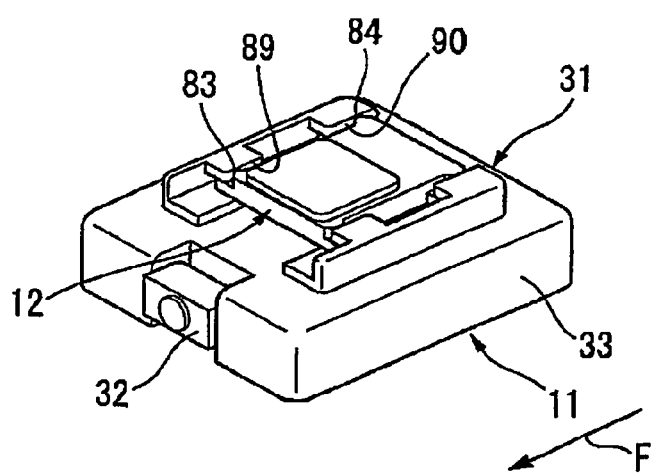
Figure 13A:
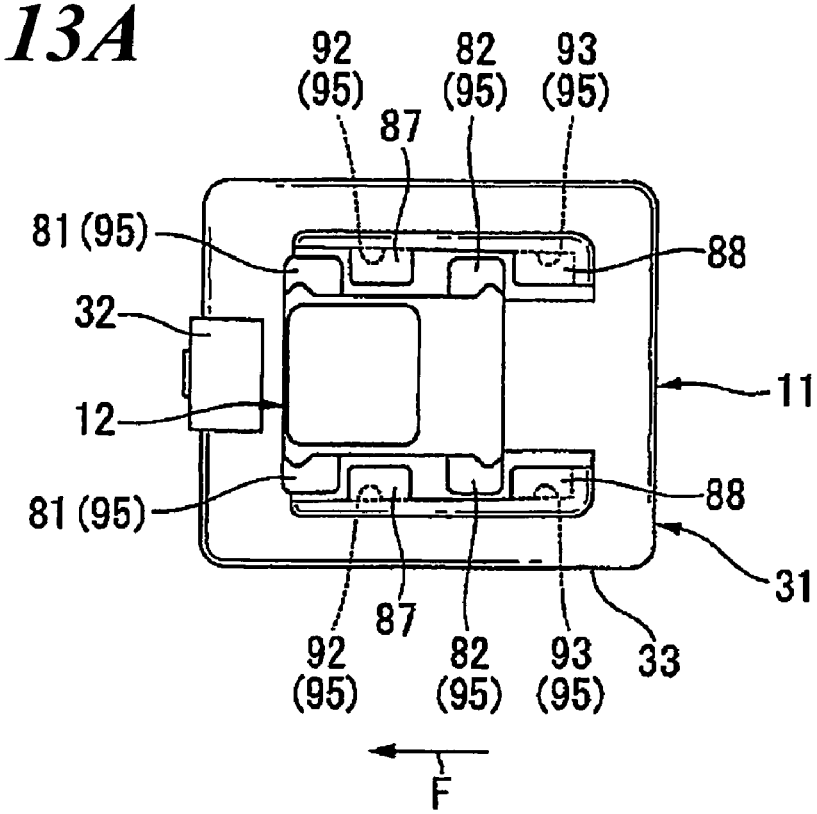
FIGS. 13A and 13B illustrate the states before and after engagement from above.
Figure 13B:
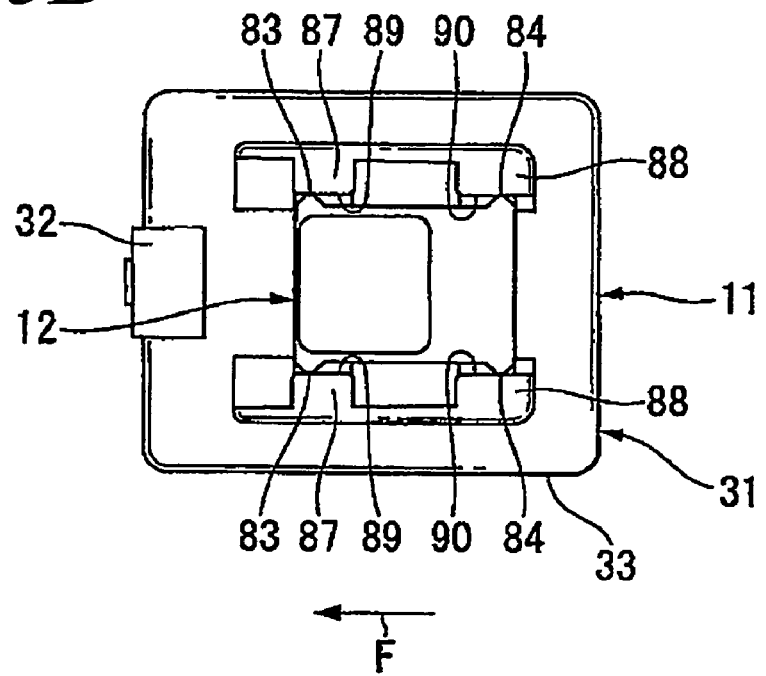

Referring to FIGS. 12 and 13, a structure for mounting a camera on a vehicle according to a fifth embodiment will be described focusing on a difference from the first embodiment.

In the fifth embodiment, in the guide plate portion 16 of the base unit 12, front slide guide portions 81 and 81 each having a rectangular plate shape are formed at the front left and right sides in the attaching direction F, and rear slide guide portions 82 and 82 each having the rectangular plate shape are formed at the rear left and right sides in the attaching direction F. In other words, the guide plate portion 16 of the base unit 12 has plural rows, specifically, two rows of the front slide guide portions 81 and 81 and the rear slide guide portions 82 and 82 are installed with an interval in the attaching direction F.

Front protrusions 83 and 83 upwardly protrude from the tops the front side slide guide portions 81 and 81. And, rear protrusions 84 and 84 upwardly protrude from the tops of the rear side slide guide portions 82 and 82. The front protrusions 83 and 83 are disposed at the front left and right sides in the attaching direction F, and the rear protrusions 84 and 84 are disposed at the rear left and right sides in the attaching direction F, respectively.

The front protrusions 83 and 83 and the rear protrusions 84 and 84 each has a triangular pole shape which becomes thinner toward the outer side in the lateral direction. The distance between the lateral outer ends of the front protrusions 83 and 83 is substantially the same with the distance between the lateral outer ends of the rear protrusions 84 and 84. Therefore, the front right protrusion 83 and the rear right protrusion 84 are aligned in a line extending in the attaching direction F, and the front left protrusion 83 and the rear left protrusion 84 are also aligned in a line extending in the attaching direction F. The front protrusions 83 and 83 and the rear protrusions 84 and 84 are formed, for example, by casting as parts of the base unit 12.

On the top surface of the case 33 of the camera 11, front left and right sliding walls 87 and 87 are formed at the front side, and rear left and right sliding walls 88 and 88 are formed at the rear side. The front sliding walls 87 and 87 and the rear sliding walls 88 and 88 extend in the front-rear direction.

The front sliding walls 87 and 87 are cut in the front-rear direction to form front facing surfaces (contact portions) 89 and 89 perpendicular to the top surface of the case 33, and the rear sliding walls 88 and 88 are cut in the front-rear direction to form rear facing surfaces (contact portions) 90 and 90 perpendicular to the top surface of the case 33. A lateral distance between the front facing surfaces 89 and 89 is substantially the same with a lateral distance between the rear facing surfaces 90 and 90. Thus, the front left facing surface 89 and the rear left facing surface 90 are aligned in a line extending in the attaching direction F, and the front right facing surface 89 and the rear right facing surface 90 are also aligned in a line extending in the attaching direction F.

A front slide concave portion 92 is depressed from the front facing surface 89 of each front sliding wall 87 to have a substantially constant depth. And, a rear slide concave portion 93 is depressed from the rear facing surface 90 of each rear sliding wall 88 to have a substantially constant depth. The front slide concave portion 92 and the rear slide concave portion 93 extend in parallel to the top surface of the case 33.

The front slide concave portions 92 and 92 are opened at both of the front side and the rear side. The rear slide concave portions 93 and 93 are opened at the front side, but closed at the rear side. As a result, on the camera 11, plural rows, specifically, two rows of the front sliding walls 87 and 87 having the front slide recess portions 92 and 92 and the rear sliding walls 88 and 88 having the rear slide concave portions 93 and 93 are laterally disposed with an interval in the front-rear direction in the attaching direction F.

The camera 11 is slid with respect to the base unit 12 toward the front side in the attaching direction F after the front slide guide portions 81 and 81 are inserted into the front slide concave portions 92 and 92 and the rear slide guide portions 82 and 82 are inserted into the rear slide concave portions 93 and 93. The front slide guide portions 81 and 81 and the rear slide guide portions 82 and 82, and the front slide concave portions 92 and 92 and the rear slide concave portions 93 and 93 form a slide mechanism 95 for detachably engaging the camera 11 to the base unit 12 through a sliding operation.

The distance between the lateral outer ends of the front protrusions 83 and 83 of the base unit 12 is substantially the same with the distance between the front facing surfaces 89 and 89 of the camera 11, and the distance between the lateral outer ends of the rear protrusions 84 and 84 of the base unit 12 is substantially the same with the distance between the rear facing surfaces 90 and 90 of the camera 11. The front left and right facing surfaces 89 and 89 and the rear left and right facing surfaces 90 and 90 of the camera 11 laterally contact the front left and right protrusions 83 and 83 and the rear left and right protrusions 84 and 84 of the base unit 12, respectively, thereby positioning the camera 11 with respect to the base unit 12.

When the camera 11 is attached to the base unit 12, as shown in FIGS. 12B and 13A, first, the front slide guide portions 81 and 81 are disposed in front of the front sliding walls 87 and 87, and the rear slide guide portions 82 and 82 are disposed in front of the rear sliding walls 88 and 88 from the bottom. Then, the front slide guide portions 81 and 81 are inserted into the front slide concave portions 92 and 92, and the rear slide guide portions 82 and 82 are inserted into the rear slide concave portions 93 and 93. In this state, the camera 11 is forwardly slid in the front-rear direction of the vehicle. Finally, the rear end portions of the rear slide concave portions 93 and 93 of the camera 11 contact the rear edges of the rear slide guide portions 82 and 82 of the base unit 12 so that the camera 11 stops. In this case, the front left and right protrusions 83 and 83 laterally contact the front left and right facing surfaces 89 and 89, respectively, and the rear left and right protrusions 84 and 84 laterally contact the rear left and right facing surfaces 90 and 90, respectively, thereby positioning the camera 11 with respect to the base unit 12.

According to the fifth embodiment, plural rows, specifically, two rows of the front slide guide portions 81 and 81 and the rear slide guide portions 82 and 82 are formed on the base unit 12, and plural rows, specifically, two rows of the front sliding walls 87 and 87 having the front slide concave portions 92 and 92 and the rear sliding walls 88 and 88 having the rear slide concave portions 93 and 93 are formed on the camera 11, with an interval in the attaching direction F. Thus, the sliding operation starts from a state where the front slide guide portions 81 and 81 and the front sliding walls 87 and 87 are dislocated in the front-rear direction, and where the rear slide guide portions 82 and 82 and the rear sliding walls 88 and 88 are dislocated from in the front-rear direction. And, the sliding operation is required merely for engaging the front slide concave portions 92 and 92 and the rear slide concave portions 93 and 93 with the front slide guide portions 81 and 81 and the rear slide guide portions 82 and 82. Therefore, the sliding amount required for attachment/detachment through the slide mechanism 95 can be shortened, thereby facilitating the attaching/detaching operation.

The front left and right protrusions 83 and 83 and the rear left and right protrusions 84 and 84 are formed to have an equal interval, and the contact portion is formed by the front facing surfaces 89 and 89 and the rear facing surfaces 90 and 90 of the front sliding walls 87 and 87 and the rear sliding walls 88 and 88 with an equal interval. As a result, positioning precision can be improved, similarly as the second embodiment. Since the contact portion that performs positioning by contacting the front protrusions 83 and 83 and the rear protrusions 84 and 84 is formed by the front facing surfaces 89 and 89 and the rear facing surfaces 90 and 90 of the front sliding walls 87 and 87 and the rear sliding walls 88 and 88, the structure can be simplified.

In the first to fifth embodiment, the case where the protrusions are formed on the base and the contact portion that performs positioning by contacting the protrusions is formed on the camera is exemplified. However, the protrusions may be formed on the camera and the contact portion may be formed on the base.

The invention claimed is:

1. A structure for mounting a camera on a vehicle, the structure comprising:
   a base unit fixed to a vehicle body, the base unit including:
      a front edge;
      a rear edge parallel to the front edge;
      front longitudinal edges extending rearwardly from lateral outer ends of the front edge;
      middle lateral edges extending laterally inwardly from respective rear ends of the front longitudinal edges; and
      rear longitudinal edges extending rearwardly from respective inner ends of the middle lateral edges to reach lateral outer ends of the rear edge;
   a camera;
   a slide mechanism configured to allow the camera to slide in an attaching direction so as to be detachably engaged with the base unit;
   protrusions provided on one of the base unit and the camera, the protrusions being disposed at front left and right sides and rear left and right sides with respect to the attaching direction; and
   contact portions provided on the other of the base unit and the camera, the contact portions laterally contacting the front left and right protrusions and the rear left and right protrusions, respectively, thereby positioning the camera with respect to the base unit.

2. The structure of claim 1,
   wherein the base unit includes
      slide guide portions provided at the left and right sides in the attaching direction, the slide guide portions having a distance therebetween larger at the front side in the attaching direction than the rear side,
   wherein the camera includes
      sliding walls provided at the left and right sides in the attaching direction, the sliding walls having facing surfaces in which slide concave portions are formed, the sliding walls having a distance therebetween larger at the front side in the attaching direction than the rear side, and
   wherein the slide mechanism is formed by the slide guide portions and the slide concave portions.

3. The structure of claim 2,
wherein the front left and right protrusions and the rear left and right protrusions are formed on the base unit,
wherein the front left and right contact portions and the rear left and right contact portions are formed on the camera,
wherein a distance between lateral outer ends of the front left and right protrusions is larger than a distance between lateral outer ends of the rear left and right protrusions, and
wherein a distance between the front left and right contact portions is larger than a distance between the rear left and right contact portions.

4. The structure of claim 3,
wherein the contact portions are formed by the facing surfaces of the left and right sliding walls.

5. The structure of claim 3,
wherein the contact portions are formed by left and right inclined surfaces which have a lateral distance therebetween increased toward the front side in the attaching direction.

6. The structure of claim 2,
wherein the front left and right protrusions and the rear left and right protrusions are formed on the base unit so as to be equally spaced apart in the attaching direction,
wherein the front left and right contact portions and the rear left and right contact portions are formed on the camera so as to be equally spaced apart in the attaching direction, and
wherein front recess portions are formed at the front sides of the front left and right contact portions in the attaching direction so as to have an increased lateral distance therebetween, and rear recess portions are formed at the front sides of the rear left and right contact portions in the attaching direction so as to have an increased lateral distance therebetween.

7. The structure of claim 6,
wherein the front left and right contact portions and the front left and right recess portions are formed by front left and right inclined surfaces which have a lateral distance therebetween increased toward the front side in the attaching direction, and
wherein the rear left and right contact portions and the front left and right recess portions are formed by rear left and right inclined surfaces which have a lateral distance therebetween increased toward the front side in the attaching direction.

8. The structure of claim 7, wherein the lateral distance between the front left and right inclined surfaces at a rearmost portion in the attaching direction is smaller than the lateral distance between the rear left and right inclined surfaces at a frontmost portion in the attaching direction.

9. The structure of claim 1, wherein the front longitudinal edges, the middle lateral edges, and the rear longitudinal edges form slide glide portions at the left and right sides in the attaching direction, and
wherein the protrusions are provided separately from the slide guide portions.

10. The structure of claim 9, wherein each of the protrusions are provided inward laterally of the slide guide portions.

11. The structure of claim 9, wherein each of the protrusions has a triangular pole shape that becomes thinner toward a lateral outer side.

12. A structure for mounting a camera on a vehicle, the structure comprising:
a base unit fixed to a vehicle body;
a camera;
a slide mechanism configured to allow the camera to slide in an attaching direction so as to be detachably engaged with the base unit;
protrusions provided on one of the base unit and the camera, the protrusions being disposed at front left and right sides and rear left and right sides with respect to the attaching direction; and
contact portions provided on the other of the base unit and the camera, the contact portions laterally contacting the front left and right protrusions and the rear left and right protrusions, respectively, thereby positioning the camera with respect to the base unit,
wherein left and right slide guide portions are provided on the base unit in plurality along the attaching direction,
wherein left and right sliding walls are provided on the camera in plurality along the attaching direction, slide concave portions being formed by the plurality of left and right sliding walls, and
wherein the slide mechanism is formed by the plurality of slide guide portions and the slide concave portions of the plurality of sliding walls.

13. The structure of claim 12,
wherein the contact portions are formed by the facing surfaces of the plurality of left and right sliding walls at positions corresponding to the front left and right protrusions and the rear left and right protrusions.

* * * * *

UNITED STATES PATENT AND TRADEMARK OFFICE
CERTIFICATE OF CORRECTION

PATENT NO. : 8,337,099 B2  
APPLICATION NO. : 13/200713  
DATED : December 25, 2012  
INVENTOR(S) : Motoyasu Onishi et al.

Page 1 of 1

It is certified that error appears in the above-identified patent and that said Letters Patent is hereby corrected as shown below:

Column 16, Line 8, In Claim 9, delete "glide" and insert -- guide --, therefor.

Signed and Sealed this  
Twenty-sixth Day of March, 2013

Teresa Stanek Rea  
*Acting Director of the United States Patent and Trademark Office*